United States Patent
Jacoby et al.

[11] 4,049,336
[45] Sept. 20, 1977

[54] PULSED HOLOGRAPHIC SYSTEM HAVING INDEPENDENT UNIVERSAL BEAM ADJUSTMENT

[75] Inventors: Jerold L. Jacoby, Long Beach; William S. Tierney, Palos Verdes Peninsula; James E. Wright, Long Beach; Pravin G. Bhuta, Torrance, all of Calif.

[73] Assignee: TRW Inc., Redondo Beach, Calif.

[21] Appl. No.: 598,901

[22] Filed: July 24, 1975

[51] Int. Cl.² ............... G03H 1/02; G02B 7/02; G03B 5/06
[52] U.S. Cl. ............... 350/3.5; 354/286
[58] Field of Search ........... 350/3.5, 252; 356/32, 356/109; 354/286, 288; 73/67.5 R, 67.5 H, 71.3, 88 A

[56] References Cited

U.S. PATENT DOCUMENTS

| | | | |
|---|---|---|---|
| 3,598,484 | 8/1971 | Redman et al. | 350/3.5 |
| 3,675,990 | 7/1972 | Kogelnik et al. | 350/3.5 |
| 3,736,039 | 5/1973 | Hay | 350/3.5 |
| 3,822,087 | 7/1974 | Bolusset et al. | 350/3.5 |
| 3,837,726 | 9/1974 | Suzuki et al. | 350/3.5 |
| 3,851,974 | 12/1974 | Ravussin et al. | 356/153 |
| 3,922,060 | 11/1975 | Oosaka et al. | 350/3.5 |

FOREIGN PATENT DOCUMENTS 1,139,955  1/1969  United Kingdom ............ 350/3.5

OTHER PUBLICATIONS

Staselko et al., "Production of High-Quality Holograms of Three-Dimensional Diffuse Objects with the Use of Single Mode Ruby Lasers", Optics & Spectroscopy, vol. 25, 12-1968, pp. 505-507.

Park et al., "Monitoring Concurrent Exposure & Development of Photosensitive Medium", IBM Tech. Disclosure Bull., 5-1969, pp. 1750-1751.

*Primary Examiner*—John K. Corbin
*Assistant Examiner*—Wm. H. Punter
*Attorney, Agent, or Firm*—John J. Connors; Donald R. Nyhagen; Edwin A. Oser

[57] ABSTRACT

An improved holographic instrument for evaluating the structural integrity of a load-bearing structure by recording on a holographic recording medium two successive holograms of the structure under differing stress conditions to produce a holographic interferogram containing information defining a deformation fringe pattern representing the deformations in the structure resulting from the change in stress conditions. A holographic recording unit for the optical signature instrument and for general holographic recording use.

30 Claims, 12 Drawing Figures

PULSED HOLOGRAPHIC SYSTEM HAVING INDEPENDENT UNIVERSAL BEAM ADJUSTMENT

The invention herein described was made in the course of or under a contract or subcontract thereunder with the Department of Defense.

RELATED APPLICATIONS

Reference is made to copending applications Ser. No. 456,998 by Pravin G. Bhuta et al. for "Optical Signature Method and Apparatus for Structural Integrity Verification", now U.S. Pat. No. 3,911,733 Ser. No. 598,900 (TRW Docket 74-233) by William S. Tierney et al. for "Electromagnetic Impulser for Dynamically Loading a Structure", now U.S. Pat. No. 4,019,374 and Ser. No. 598,899 (TRW Docket 74-246) by Jerold L. Jacoby et al. for "Universal Holographic Optics Orientation Assembly," now U.S. Pat. No. 3,993,399.

BACKGROUND OF THE INVENTION

1. Field of the Invention

This invention relates generally to the field of holography and more particularly to a novel holographic recording unit and to a compact mobile holographic instrument embodying the recording unit for evaluating the structural integrity of load-bearing structures utilizing holographic interferometry.

2. Prior Art

As will become readily apparent from the ensuing description, the recording unit of the invention may be utilized for general purpose holographic recording and the holographic instrument may be utilized to evaluate the structural integrity of virtually any structure. However, the recording unit and holographic instrument are particularly adapted for evaluating the integrity of aircraft structures and other similar redundant load-bearing structures, that is load-bearing structures having multiple load paths. For this reason, the invention will be described in connection with this particular use. In view of the above noted broader utility of the instrument, it will be understood that this described application involving aircraft inspection is purely illustrative and not limiting in nature.

An aircraft wing is a highly redundant load-bearing structure having multiple internal load-bearing members providing multiple load paths through the structure. The wing structure is designed to sustain loads substantially in excess of those which are encountered in normal aircraft service. Over a period of time, however, a wing structure is prone to loss of its structural integrity, that is weakening of its load-bearing members due to fatigue damage, stress corrosion cracking, and other causes. Fatigue damage, of course, involves cracking of the wing load-bearing members, loosening of joints and rivets, and other weakening of the wing structure caused by the frequent load reversals which occur in the structure during flight, landing, and take-off. Stress corrosion cracking occurs in aircraft which operate in an ocean environment and is caused by the corrosive action of salt water. In order to assure continued safe aircraft operation, therefore, it is necessary to periodically evaluate the structural integrity of aircraft wings, as well as other parts of the aircraft, of course.

A variety of inspection and testing techniques have been devised to evaluate the structural integrity of aircraft wings and other aircraft parts. One common inspection technique, for example, involves installing accelerometers on selected structural members for counting stress reversals experienced by the members. From these counts and a statistical model bases on the behavior of the particular aircraft structure of interest and statistical considerations regarding the distribution and size of defects, fatigue damage may be predicted. At appropriate times, the wing structure may be disassembled and subjected to actual fatigue inspection using x-rays or other nondestructive inspection techniques and/or fatigue damage tests. This method of evaluating structural integrity, however, is extremely costly and time consuming. The same applies to the current methods of inspecting aircraft wings and other structures for stress corrosion cracks, which methods require stripping all paint from the surfaces to be inspected, inspection of the surfaces by ultrasonic or other inspection techniques, and repainting of the surfaces. Accordingly, there is a need for an improved nondestructive inspection technique for evaluating the structural integrity of load-bearing structures, particularly highly redundant load-bearing structures, such as aircraft wings and other aircraft structures and parts.

The earlier mentioned copending application Ser. No. 456,998, provides such an improved inspection or structural integrity verification technique, and apparatus for its practice, involving holographic interferometry. This improved inspection technique is based on the fact that any loss of structural integrity, that is weakening, of a load-bearing structure due to fatigue damage, stress corrosion cracking, or other causes reduces the effective stiffness of the structure. Such reduction in stiffness, in turn, changes the deformations which the structure will experience in response to any given loading or stressing of the structure. The improved inspection technique utilizes holographic interferometry to detect such distortion changes and thereby changes in the structural integrity of the test structure.

According to the improved inspection technique, a load-bearing structure is periodically inspected by establishing in the structure two successive predetermined stress conditions of differing magnitude and recording on the same holographic recording medium two successive holograms of the structure while the latter is in these stress conditions. The resulting holographic recording is an interferogram which may be holographically reconstructed to produce a deformation fringe pattern whose fringe lines depict or represent the deformations occurring in the structure due to the change from one stress condition to the other. This inspection procedure is repeated periodically using the same stress conditions, and the deformation fringe patterns of the successive interferograms are compared to determine differences, if any, in the fringe patterns. Such differences, if any, between the successive fringe patterns are indicative of a change in the structural integrity or stiffness of the structure in the intervals between recording of the interferograms.

The two stress conditions required for each periodic inspection of the structure may be established by either or both static or dynamic loading of the structure. According to the static loading procedure, the structure to be inspected is subjected to a given static load, which may be simply the weight of the structure or an additional static load, during recording of the first hologram. The static load on the structure is then changed and the second hologram is recorded. According to the dynamic loading procedure, an impact or impulsive load is applied to the structure to effect propagation of stress waves through the structure. These stress waves establish a first stress in the structure when the first hologram is recorded and a second stress condition when the second hologram is recorded. According to the combined static and dynamic loading procedure, the structure is subjected to a constant static load in addition to the impulsive load.

The inspection apparatus of the copending application Ser. No. 456,998 for practicing the inspection technique of the application comprises a holographic recording unit for recording successive holograms of a selected region of the structure under inspection, an impulser for dynamically loading the structure to propagate stress waves through the region, and control means for operating the recording unit and impulser in timed relation such that each pair of successive holograms are recorded under different stress conditions in the region of interest of the structure to produce a holographic interferogram defining a deformation fringe pattern. As described above, the deformation fringe patterns of successive interferograms are compared to determine a change, if any, in the structural integrity of the structure.

SUMMARY OF THE INVENTION

According to one of its aspects, this invention provides an improved holographic recording unit for general holographic and holographic interferrometric recording purposes. This recording unit has a mounting base mounting a pulsed laser holographic recording system for illuminating a holographic recording field in front of the unit with a scene beam and illuminating with reference beam a holographic recording medium positioned in a holder, hereafter referred to for convenience as a film holder, mounted on the front of the instrument. The recording medium, referred to herein as film, is positioned with its sensitive surface facing the recording field, such that recording operation of the unit with a subject positioned in the field effects recording of a hologram of the subject on the film. This recording unit has several features which adapt it to its intended purposes. These features include a unique arrangment for adjusting the position or direction of the holographic recording field relative to the recording unit mounting base to permit the unit to be "pointed" or "aimed" toward subjects in different directions without moving the entire unit; an arrangement for adjusting the holographic optics to "focus" the recording unit at different distances; a unique arrangement for both thermally stabilizing the holographic optics and maintaining a moisture-free environment about the optics; a unique film shutter and laser control arrangement for operating the shutter and holographic laser in timed relation to record a hologram; and the overall arrangement of the recording unit whereby that latter is readily portable from one location to another and is easily installed for use at each location. Other features of the recording unit will also appear as the description proceeds.

According to another aspect of the invention, the latter provides an improved holographic recording instrument including the holographic recording unit for structural integrity evaluation, such as non-destructive evaluation of load bearing structures and strain mapping of complex structures. Another use of the instrument involves practicing the structural integrity verification or inspection technique of the copending application Ser. No. 456,998.

This instrument includes, in addition to the recording unit, an impulser for dynamically loading the structure under inspection to propagate stress waves through the structure, and control means triggered by the film shutter of the recording unit for operating the impulser and holographic laser in timed relation to produce the interferograms, with their deformation fringe patterns involved in inspection technique. The instrument is readily portable from one inspection site to another and is quickly and easily set up at each site. The instrument is described in connection with inspecting aircraft structures for structural integrity.

DESCRIPTION OF THE PREFERRED EMBODIMENTS

Figure 1:
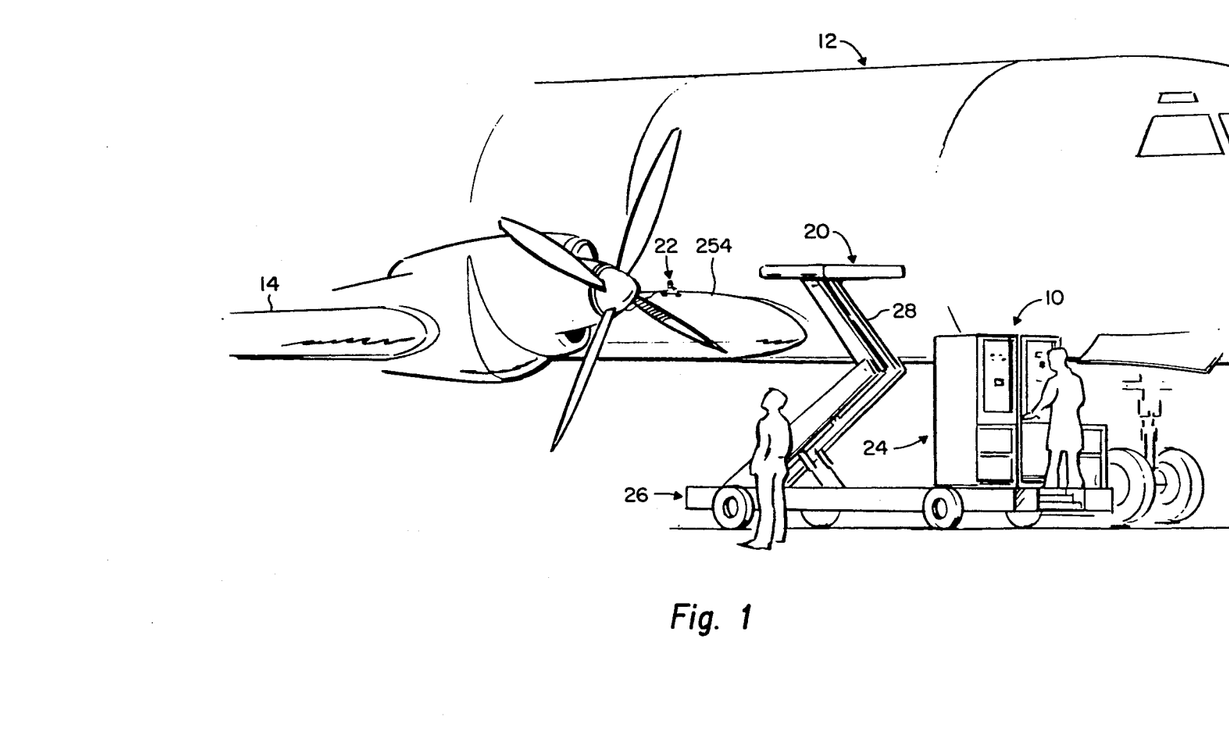
FIG. 1 is a perspective view illustrating the manner of using an optical signature instrument according to the invention for inspecting an airplane wing.
Figure 2:
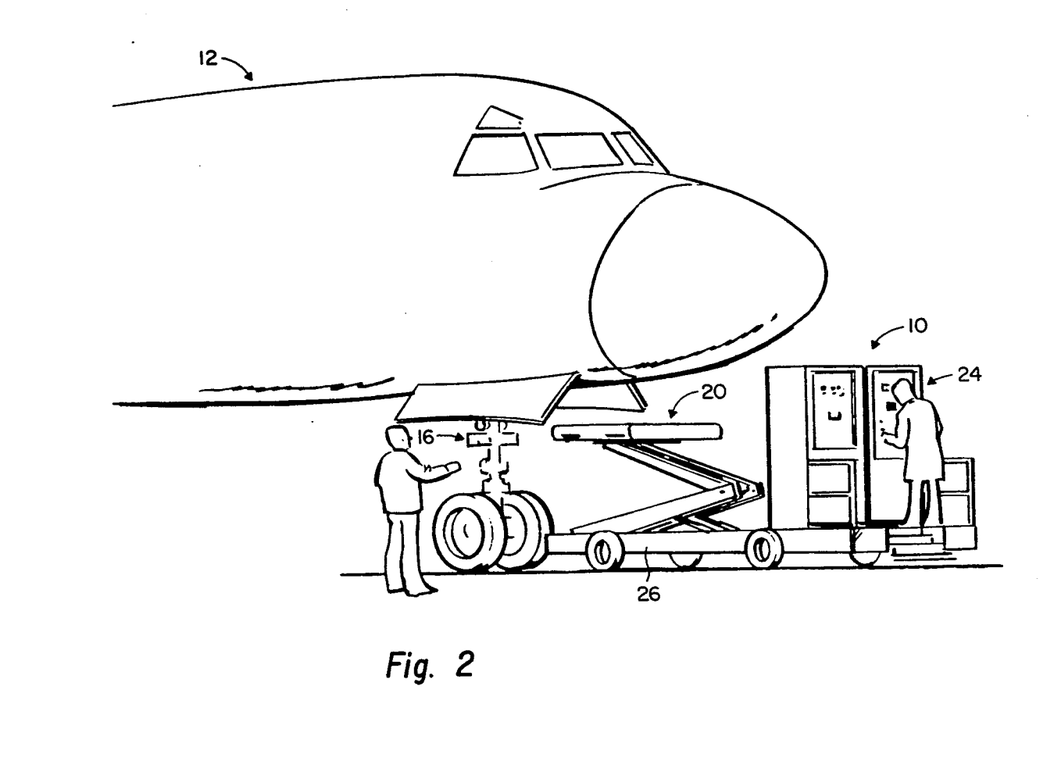
FIG. 2 is a perspective view illustrating the manner of using the instrument for inspecting an airplane nose area.
Figure 3:
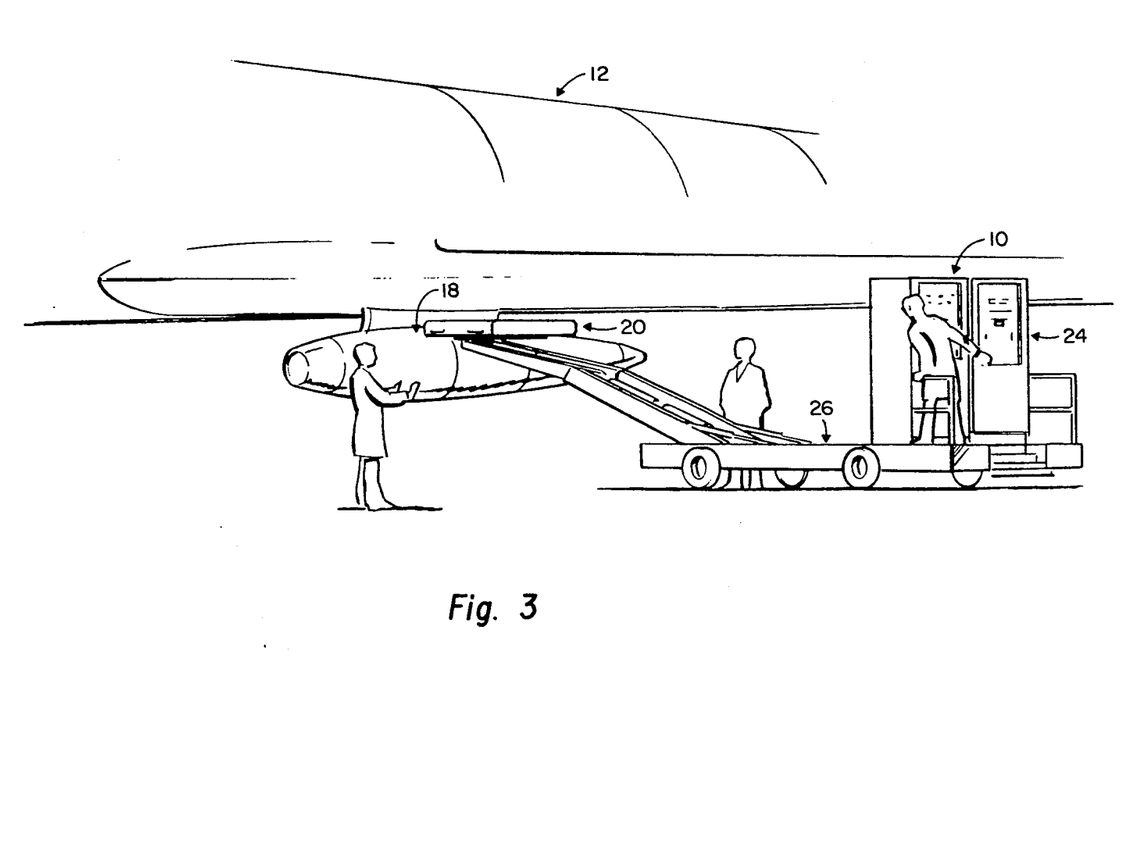
FIG. 3 is a perspective view illustrating the manner of using the instrument for inspecting an airplane jet engine.

Referring first to FIGS. 1-3 of the drawings, there is illustrated a holographic instrument 10 according to the invention being used to practice the inspection technique of copending application Ser. No. 456,998 for inspecting a variety of structures of an airplane 12, such as the wing 14 in FIG. 1, the nosewheel gear 16 in FIG. 2, and the jet engine nacelle 18 in FIG. 3.

In general terms, the holographic instrument 10, hereafter referred to as an optical signature instrument, comprises a holographic recording unit 20, an impulser 22, and a control unit 24. Instrument 10 operates in a manner which will be described in detail later. Suffice it to say here that the operation involves actuation of the recording unit 20 and impulser 22 in timed relation to impulsively load the aircraft structure being inspected and thereby produce stress waves which travel through the structure, and to record two successive holograms of a selected region of interest of the structure under differing stress conditions in the region resulting from the passage of the stress waves through the region. These two holograms are recorded on the same holographic recording medium or film to produce a double exposure hologram or interferogram containing a deformation fringe pattern representing the surface displacements produced in the region by the change in stress conditions. This procedure is repeated periodically on an aircraft structure to yield a set of interferograms whose fringe patterns may be compared to evaluate the structural integrity of the aircraft structure.

The holographic recording unit 20 and control unit 24 are mounted on a truck 26 having a hoist 28 which supports the recording unit. The truck is movable and the hoist may be raised and lowered to locate the recording unit in a desired position relative to the aircraft structure to be inspected. FIGS. 1-3, for example, illustrate typical operational placements of the recording unit. The impulser 22 is placed on or attached to the structure to be inspected for impulsively loading the structure, as explained later.

It is worthwhile to again point out here that while the holographic recording unit 20 is described in connection with its use for structural integrity evaluation of an airplane, the unit may be used by itself as a general purpose holographic recording instrument for recording either simple holograms or interferograms of any subject.

Turning to FIGS. 4-9, the holographic recording unit 20 comprises a housing 30 containing a pulsed laser holographic recording system 32. This recording system includes a pulsed laser 34, holographic optics 36 for splitting the pulsed laser output beam 37 into an internal scene beam 38 and an internal reference beam 40, and a universal optics assembly 42 which receives the beams and directs the scene beam outwardly from the recording unit along an external beam path $P_1$ to illuminate the aircraft structure to be inspected (or other subject of interest). The optics assembly directs the reference beam 40 along an external path $P_2$ toward the aperature 44 of a shutter 46 on the assembly to illuminate, when the shutter is open, a holographic recording medium or film contained in a film holder 50 removably mounted on the rear side of the shutter.

As will be explained in more detail later, the universal optics assembly 42 is pivotally mounted on the housing 30, about an axis parallel to the front edge of the housing in FIG. 4, to angularly adjust the external scene beam path $P_1$, reference beam path $P_2$, shutter 46, and film holder 50 in unison relative to the housing. Thus, pivotal movement of the optics assembly rotates the external scene beam path $P_1$ in a vertical plane relative to the housing 30. The shutter 46, film holder 50 and external reference beam path $P_2$ rotate with the optics assembly so that the shutter aperture 44 always faces in the direction of the external scene beam path, and the external reference beam path $P_2$ is always directed toward the aperture, throughout the range of pivotal movement of the optics assembly.

It is worthwhile to note here that the shutter 46 is provided to enable operation of the holographic recording unit 20 in ambient light. However, the unit is capable of operation in the dark without the shutter, as will appear from the ensuing description. Moreover, while the pivotal mounting of the optics assembly performs a highly useful purpose, to be described shortly, it is not essential to the operation of the unit, as will be explained later.

In addition to the above basic elements, the holographic recording system 32 also includes a c-w alignment laser 52 for directing an alignment laser beam 53 through the pulsed laser 34 and then through the holographic optics 36 along the same path as the pulsed laser beam, and alignment means 54 for precisely aligning the path of the alignment beam with the path of the pulsed laser beam, such that when the alignment laser is activated, the optical assembly 42 directs the alignment beam outwardly from the recording unit along the same path $P_1$ as the scene beam 38 of the pulsed laser. Between the lasers 34 and 52 is a shutter-sensor unit 56 which, when open, passes the alignment beam to the pulsed laser 34, as described, and when closed acts to sense the intensity of the pulsed laser beam. Located in the common internal beam path of the lasers 34 and 52 is a laser amplifier 58. The recording unit also includes a combination temperature control-purge system 60 for maintaining a relatively constant temperature in and purging moisture, dust, etc. from the housing 30.

Briefly, in operation of the holographic recording unit 20 in the optical signature instrument 10, the recording unit is mounted on the hoist 28 of the instrument truck 26, and the latter and hoist are positioned to locate the recording unit in proper holographic recording position relative to the selected aircraft structure to be inspected, as shown in FIGS. 1-3, for example. The alignment laser 52 is then activated with the shutter-sensor unit 56 open to produce a c-w alignment laser beam which is directed outwardly from the recording unit toward the selected aircraft structure, along the path $P_1$ of the pulsed laser scene beam 38, by the universal optics assembly 42 of the recording unit. The optics assembly is rotatable about its pivot axis to aim the alignment beam, and thereby the optics assembly as well as the holographic system 32 as a whole, at a selected region of interest of the aircraft structure. It is worthwhile to note here that this adjustability of the optics assembly 42 constitutes an important feature of the invention which enables pointing or aiming of the holographic system 32 at a selected region of interest of the aircraft structure without adjustment of the entire recording unit.

After the recording unit 20 has been properly positioned relative to and aimed at the region of interest of the aircraft structure to be inspected, the unit is operated in its recording mode to record a double exposure hologram or interferogram of the region. As will appear from the later description, operation of the recording unit in its recording mode involves initial actuation of the optics assembly shutter 46 to momentarily open its aperture 44. This shutter actuation triggers actuation of the impulser 22 to impulsively load the aircraft structure and thereby produce stress waves in the structure which travel through its region of interest to be inspected. Actuation of the impulser, in turn, triggers pulsing of the pulsed laser 34 twice in rapid succession while the shutter 46 is still open and in timed relation to the passage of the stress waves through the structure to record on the film in the film holder 50 two successive holograms of the region of interest under differing stress conditions in the region resulting from the passage of the stress waves through the region. As noted earlier, the resulting double exposure hologram is an interferogram containing a deformation fringe pattern representing the surface displacements or deformations produced in the region by the stress wave induced stress changes.

Referring now in greater detail to the illustrated holographic recording unit 20, the unit housing 30 has a double-walled base plate 62 and a removable cover 64 with depending side walls 66 which are releasably secured to the base plate by screws 68 or the like. Base plate 62 comprises a pair of spaced parallel plate members 70 between which are disposed a pair of tubes 72 and 74. These tubes are arranged in heat transfer relation to one another and extend back and forth in serpentine fashion between the plate members so as to encompass virtually the entire surface area of these members. Connected to the ends of tube 72 are hoses 76 for circulating a constant temperature fluid, such as water, at approximately room temperature through the tube. Connected to one end of tube 74 is a hose 78 for circulating a dry gas, such as nitrogen, through the tube. As will be explained presently, the opposite end of the dry gas tube 74 opens to the interior of the housing 30 above the base plate 62 for exhausting the gas into the housing. The gas then flows through the housing and finally exhausts to atmosphere through a vent port 80 in the housing cover 64.

The above described arrangement for circulating the constant temperature fluid and dry gas through the housing 30 constitutes the temperature control and purge means 60 referred to earlier. Thus, during its passage through the tube 74, the gas undergoes heat transfer with the constant temperature fluid in the tube 72 and hence emerges into the housing 30 approximately at the temperature of the fluid. During its flow through the housing, the gas provides a relatively constant temperature atmosphere within the housing and purges moisture, dust, and the like from the housing. Moreover, the gas maintains the interior of the housing at a pressure slightly greater than ambient pressure to prevent the entrance of dust into the housing.

The pulsed laser 34 is mounted on the base plate 62 along and with its axis generally parallel to the rear edge of the plate. This laser is preferably a pulsed ruby laser, although other pulsed lasers may be used, and is conventional so that no further description of the laser is necessary. The laser output beam 37 emerges from the right end of the laser in FIG. 4.

As noted earlier, the laser beam 37 is split into scene and reference beams 38 and 40 by the holographic optics 36, which will now be described by reference to FIGS. 4–6. These optics include a number of optical reflectors which are actually prisms, as shown in FIG. 4, but which may be, and for convenience are shown in FIGS. 5 and 6 as mirrors. In the following description of the optics, these reflectors are referred to as reflectors.

Figure 4:
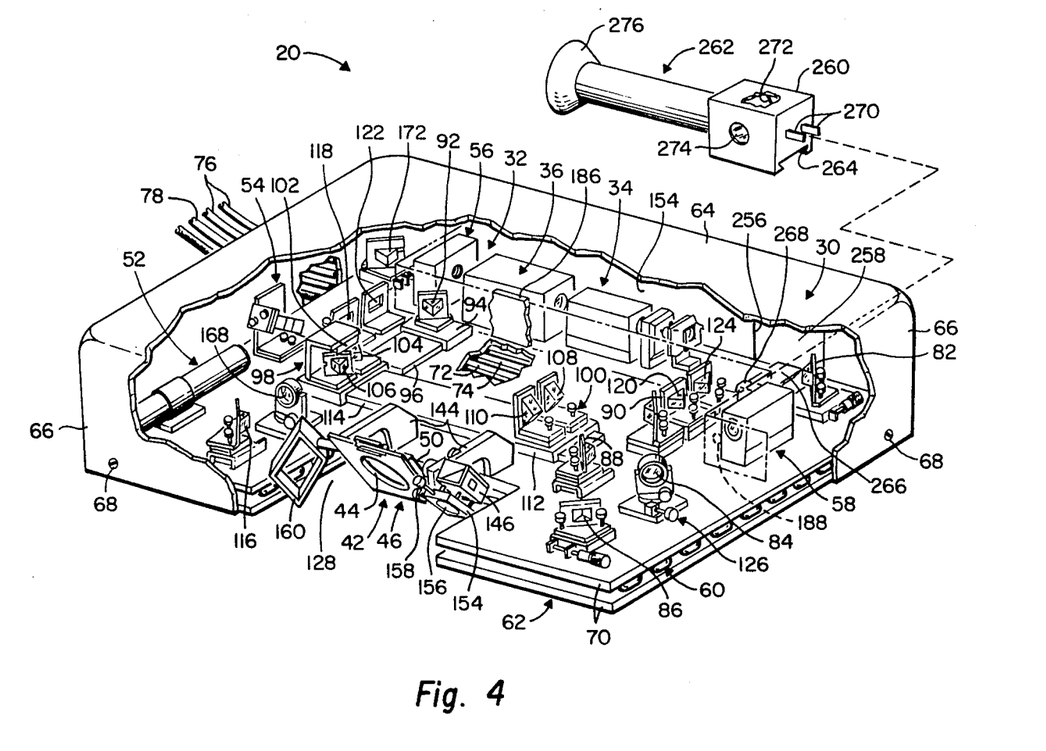
FIG. 4 is a perspective view of a holographic recording unit of the instrument.
Figure 5:
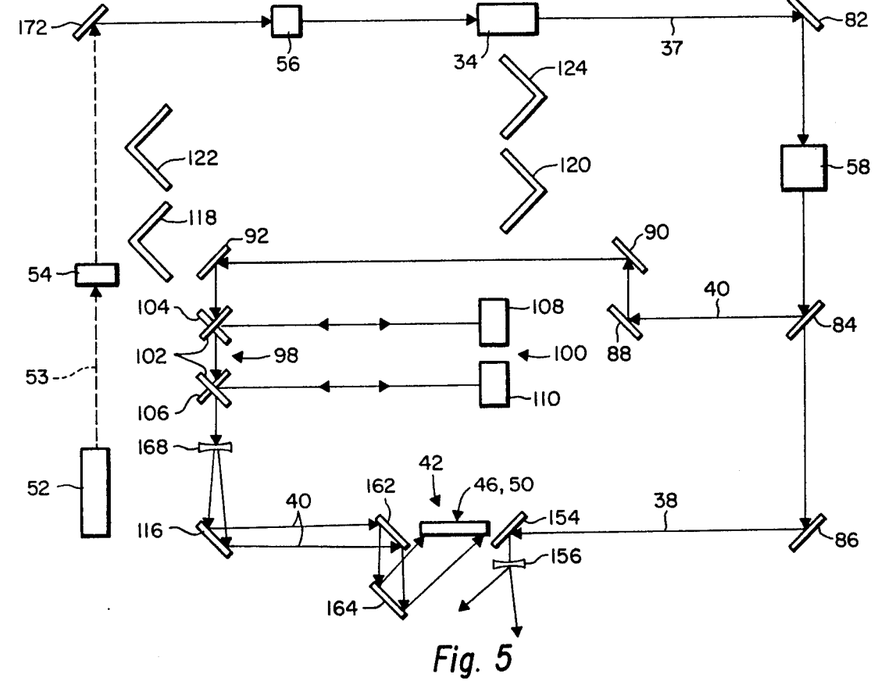
FIGS. 5 & 6 are optical diagrams of the recording unit in two different optical settings.
Figure 6:
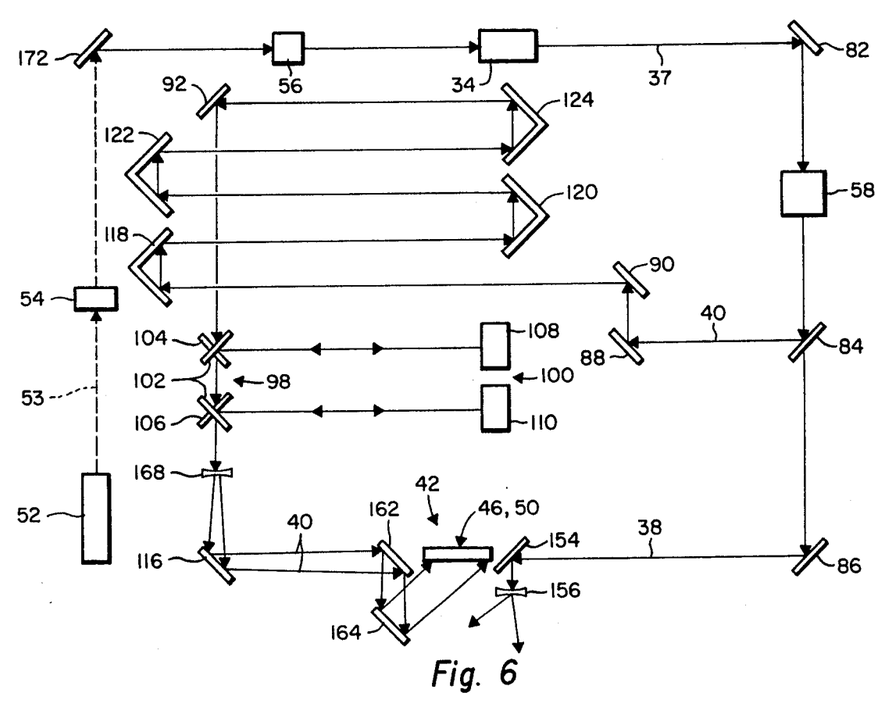
Figure 7:
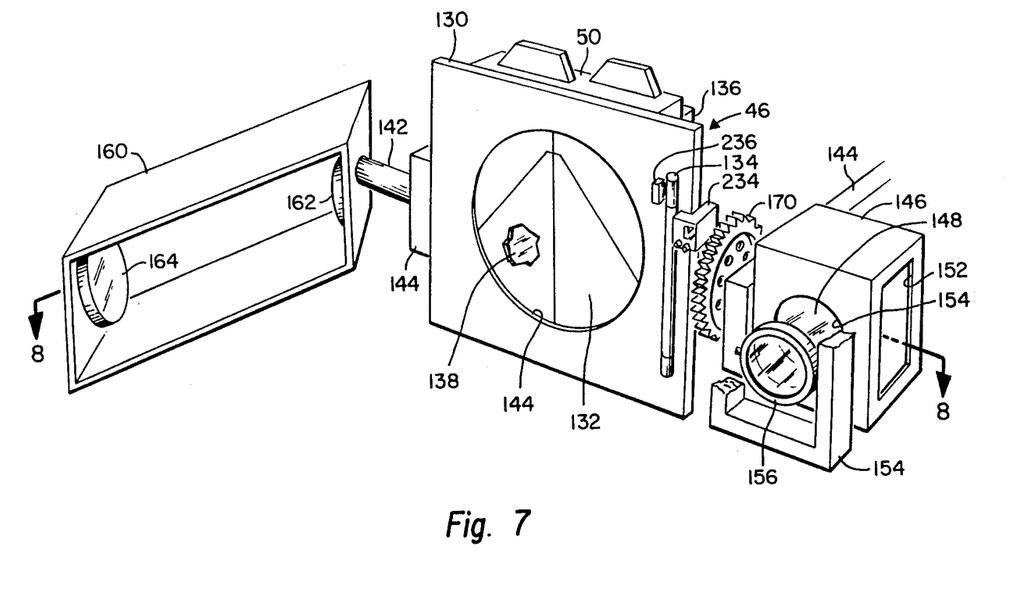
FIG. 7 is a perspective view of an adjustable optics assembly of the instrument.
Figure 8:
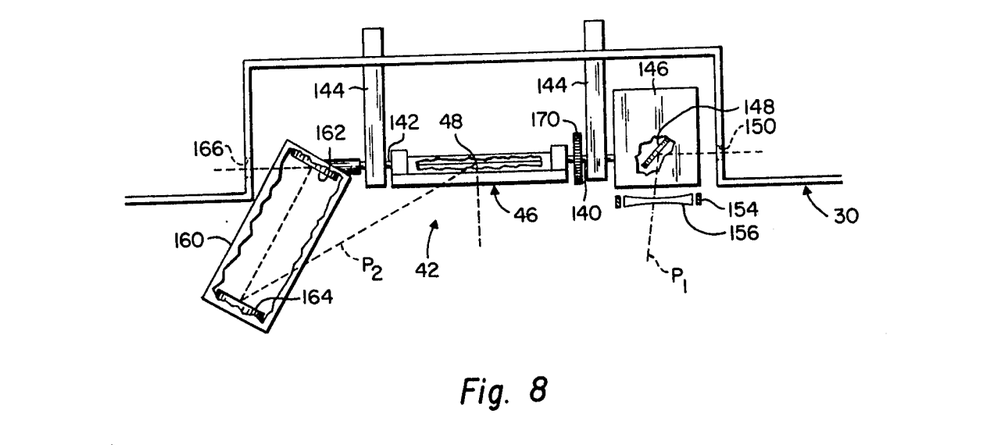
FIG. 8 is a section through the assembly taken on line 8 — 8 in FIG. 7.

Turning now to FIGS. 4–6, the holographic optics 36 include a reflector 82 at the rear right hand corner of the base plate 62 which reflects the laser output beam 37 forwardly, along the right hand side of the plate, through the laser amplifier 58 to a beam splitter 84 on the plate. This beam splitter splits the beam 37 into the scene beam 38 and reference beam 40. Scene beam 38 passes through the beam splitter 84 to a reflector 86 at the right front corner of the base plate which reflects the beam to the left toward and along the pivot axes of the universal optics assembly 42, soon to be described. The reference beam 40 is relfected to the left from the beam splitter 84 to a reflector 88 and then rearwardly to a reflector 90, both mounted on the base plate. The reference beam is again reflected to the left from the reflector 90 along a path which intersects the fore or aft direction line of movement of an adjustable reflector 92.

Reflector 92 is mounted on a slide 94 which is movable back and forth along a guide 96 fixed to and extending in the fore and aft direction of the base plate 62. Reflector 92 is adjustable to its forward position of FIG. 5 and to its intermediate broken line and rearward solid line position of FIG. 6. In its forward position of FIG. 5, the reflector 92 is situated in the path of the reflected reference beam 40 from reflector 90 and reflects the beam forwardly to a fixed reflector assembly 98 on the base plate 62 which cooperates with an adjustable reflector assembly 100. Fixed reflector assembly 98 comprises an upper horizontal corner reflector 102 and two lower reflectors 104 and 106. The adjustable reflector assembly 100 comprises a pair of vertical corner reflectors 108 and 110 mounted on a slide 112 which is movable along a guide 114 fixed to and extending crosswise of the base plate 62.

The adjustable reflector 92 and the reflector assemblies 98 and 100 are optically aligned in such a way that when the reflector 92 is set in its position of FIG. 5, the reference beam 40 incident on the reflector is reflected forwardly to reflector 104, then to the right to the lower reflecting surface of corner reflector 108, the upwardly to the upper reflecting surface of the latter reflector, then to the left to the rear reflecting surface of corner reflector 102, then forwardly to the front reflecting surface of the latter reflector, then to the right to the upper reflecting surface of corner reflector 110, then downwardly to the lower reflecting surface of the latter reflector, then to the left to reflector 106, and finally forwardly from the latter reflector to a reflector 116 on the base plate 62. The reflector 116 reflects the reference beam 40 to the right toward and along the pivot axis of the universal optics assembly 42.

In the rearward position of reflector 92 shown in FIG. 6, the reference beam 40 from reflector 90 impinges a corner reflector 118 and is then reflected to the right to corner reflector 120, then to the left to corner reflector 122, then to the right to corner reflector 124, and finally back to the left to adjustable reflector 92. The reference beam is reflected forwardly from the reflector 92 to the fixed reflector assembly 98, and then back and forth between this assembly and the adjustable reflector assembly 100 and finally to the reflector 116 in the same manner as described above in connection with the FIG. 5. In the intermediate position of reflector, the reference beam reflects from corner reflector 120 to reflector 92 and then to reflector assembly 98. In each position or setting of the adjustable reflector 92, therefore, the output beam 37 from the pulsed laser 34 is split into the scene and reference beams 38 and 40 which are finally directed toward the universal optics assembly 42 from opposite sides and along the pivot axis of the assembly. It will be further understood that adjustment of the reflector 92 between its two settings provides a coarse or gross adjustment of the reference beam path length, while adjustment of the reflector assembly 100 along its guide 114 toward and away from the fixed reflector assembly 98 provides a fine reference beam path length adjustment. The individual fixed reflectors are provided with adjustment means 126 for initially aligning the holographic optics.

As noted earlier, the universal optics assembly 42 receives the scene and reference beams 38 and 40 and directs the scene beam along the path $P_1$ to illuminate the aircraft structure to be inspected (or other subject of interest) and the reference beam along the path $P_2$ to illuminate the film 48 in the film holder 50 when the shutter 46 is open. This optics assembly will now be described by reference to FIGS. 4–8. It is important to note here that the optics assembly 42 per se constitutes the subject matter of copending application Ser. No. 598,899 (TRW Docket 74-246).

The universal optics assembly 42 is situated within a rectangular recess 128 midway along the front side or edge of the recording unit housing 30. The shutter 46 of the optics assembly comprises a conventional basic shutter structure including an opaque housing 130 containing the aperture 44, which is circular and opens to the front and back sides of the housing, and normally closed shutter blades 132 operable by a shutter actuating mechanism powered by a spring-loaded plunger 134 at the front side of the housing. Depression of this plunger from its normal extended position of FIG. 7 against the action of the plunger spring cocks the shutter in such a way that release of the plunger for spring extension effects momentary opening and then reclosing of the shutter blades 132.

Film holder 50 is mounted behind the basic shutter structure described above. To this end, the shutter housing 130 is equipped at its rear side with guides 136 for slidably receiving the film holder with the film 48 exposed forwardly to the shutter through the open front side of the holder. Extending across the shutter aperture 44, between the shutter blades 132 and film 48, is a filter 138 whose purpose will be explained presently.

Rigidly joined to the vertical edges of the shutter housing 130 and extending outwardly from the housing on a common axis in plane of the film 48 and intersecting the axis of the shutter aperture 44, are a pair of journal or pivot shafts 140 and 142. As may be best observed in FIG. 8, these shafts are journalled in bearing brackets 144 which straddle the shutter 46 and are rigidly attached to the base plate 62, at the rear side of the housing recess 128. Shutter 46 is thus pivotally mounted on the housing 30 on a pivot axis parallel to the front side of the housing. This is the pivot axis of the optical assembly 42 along which the scene and reference beams 38 and 40 are directed toward the assembly by the reflectors 86 and 116, as described earlier in connection with FIGS. 4-6.

Fixxed to the right end of the optics assembly pivot shaft 140 at the right side of the adjacent shaft bearing bracket 144 is a reflector housing 146 containing a reflector 148. This reflector receives the scene beam from the reflector 86 along the pivot axis of the optics assembly and through side openings 150, 152 in the housings 30, 146 and reflects the beam forwardly through a front opening 154 in the reflector housing 146. Mounted on the front side of the reflector housing 146 is a support 154 for a scene beam expanding lens 156. The support is provided with means 158 for adjusting the lens for reasons to be explained presently.

Fixed at one end to the left end of the optics assembly pivot shaft 142 is an elongate open sided reflector housing 160 containing at its ends two reflectors 162, 164. Reflector 162 is located at the inner end of the housing, on the pivot axis of the optical assembly 42, and receives the reference beam from reflector 116 along the axis and through a side opening 166 in housing 30 and an open side of the reflector housing. The reflectors 162, 164 reflect the reference beam along the path $P_2$ toward the shutter aperture 44. Mounted on the base plate 62 just before reflector 116 is an expanding lens 168 which expands the reference beam to illuminate the entire shutter aperture area.

From the foregoing description, it will be understood that the universal optics assembly 42 receives the scene and reference beams 38, 40 along the pivot axis of the assembly and directs the expanded scene beam outwardly along the external beam path $P_1$ and the expanded reference beam toward the shutter aperture 44. The scene beam reflector 148 and expanding lens 156 are adjusted to align the scene beam path $P_1$ relative to the axis of the shutter aperture 44 in such a way that the scene beam 38 will illuminate a field, referred to herein as a holographic recording field, along the axis. Accordingly, pulsing of the laser 34 with the shutter 46 open and a subject situated within the recording field is effective to record on the film 48 a hologram of the subject. This assumes, of course, that the path lengths of the scene and reference beams are properly matched, which is accomplished by adjustment of the reflector 92 and the reflector assembly 100 in the manner explained later. It will be further understood that pivotal adjustment of the universal optics assembly 42 is effective to rotate the scene beam path $P_1$, reference beam path $P_2$, and shutter 46 in unison about the assembly pivot axes in a manner which effectively adjusts the position or direction of the recording field, or field of view, of the recording unit without moving the entire unit. This adjustment of the optics assembly is aided by a serrated handwheel 170 fixed to the assembly pivot shaft 140.

Returning now to FIGS. 4-6, it will be recalled that the holographic recording unit 20 includes an alignment laser 52 for directing an alignment laser beam 53 through the pulsed laser 34 long the axis of the pulsed laser beam. This alignment laser is a C.W. laser, such as a He-Ne laser, which is mounted at the front left hand corner of the base plate 62. The alignment beam from the laser is directed rearwardly along the left hand side of the base plate, through the beam alignment means 54 to a reflector 172 at the rear left hand corner of the base plate. The reflector 172 reflects the alignment beam to the right through the pulsed laser shutter-sensor unit 56 and then through the pulsed laser 34. After emerging from the pulsed laser, the alignment beam is directed by the holographic optics 36 along the same path as the pulsed laser beam 37, such that a portion of the alignment beam finally emerges from the recording unit along the path $P_1$ of the pulsed laser scene beam 38.

The beam alignment means 54 is provided for accurately aligning the alignment beam 53 with the scene beam path $P_1$. The particular alignment means shown in a conventional beam aligner which is adjustable to adjust the alignment beam both angularly and in translation in any direction relative to the axes of the alignment laser. Alignment of the alignment beam 53 with the scene beam path $P_1$ is accomplished by removing the beam splitter 84 and the scene beam expanding lens 156 and firing the pulsed laser 34 with a target, such as a photographic film, positioned along the path of the scene beam. Impingement of the scene beam with this target produces a spot on the target at the point of impingement of the beam with the target. Thereafter, the alignment laser 52 is activated to produce the alignment beam 53 which impinges and produces a light spot on the target at the point of impingement of the beam with the target. While the alignment laser is thus activated, the beam aligner 54 is adjusted to bring the light spot of the alignment beam into coincidence with the spot produced by the pulsed laser scene beam, thereby establishing coincidence of the alignment beam with the scene beam path $P_1$.

Figure 9:
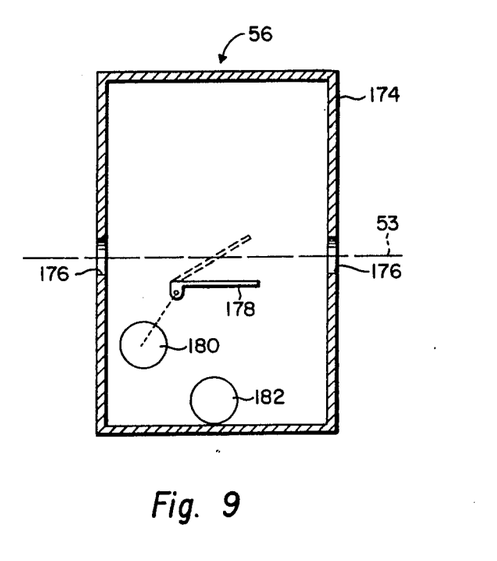
FIG. 9 is a section taken on line 9 — 9 in FIG. 4.

Referring to FIG. 9, the pulsed laser shutter-sensor unit 56 comprises a housing 174 having aligned wall openings 176 through which the alignment beam 53 may pass to the pulsed laser 34. Pivotally mounted within the housing 174 is a shutter 178 which is swingable between its full line open position and its broken line closed position by a solenoid actuator 180. In its open position, the shutter permits passage of the alignment beam through the unit 56. In its closed position, the shutter extends across the axis of the housing openings 176 at approximately a 45° angle. The surface of the shutter which faces the pulsed laser 34 in the closed shutter position is a reflecting surface, such that when the pulsed laser is fired with the shutter closed, the small fraction of the pulsed laser beam which passes through the 99% rear end reflector of the pulsed laser strikes the shutter surface and is reflected downwardly. Mounted in the bottom of the housing 174 is a photodiode detector 182 which receives the reflected beam to sense the amplitude and timing of the laser pulse, for the reasons explained below.

It will be recalled from the earlier description that the holographic recording unit 10 embodies temperature control and purge means 60 for maintaining a constant temperature in and purging moisture, dust, etc. from the housing 30 by passing dry gas, such as nitrogen, through tubes 74 in heat transfer relation to a constant temperature fluid circulating through tubes 72 and then passing the gas through the housing. To this end, the pulsed laser 34, shutter-sensor unit 56, and laser amplifier 58 are disposed in a passage-like space 184 formed in the housing 30 by a wall 186 which extends forwardly from the rear wall of the housing at the left end of the pulsed laser in FIG. 4, then to the right along the front side of the laser, then forwardly along the left side of the laser amplifier, and then to the right to the right side wall of the housing. Wall 186 has a window (not shown) through which the alignment beam 53 from the alignment laser 52 passes to the pulsed laser 34 and an opening 188 through which the output beam from the laser amplifier 58 passes to the beam splitter 84.

After its passage through the tubes 74 in heat transfer relation to the constant temperature fluid in tubes 72, the dry, temperature control-purge gas is discharged with the housing space or passage 184 at the left end of the pulsed laser 34 in FIG. 4 through an opening in the top plate member 70 of the base plate 62. The gas then flows to the right through the rear portion of the passage 184 and finally forwardly through the right hand portion of the passage and then through the wall opening 188 into the main interior space of the housing 30. The gas exits to atmosphere through the housing side wall openings 150, 166 (FIG. 8) and through any leakage spaces which may exist in the housing.

It will be understood, therefore, that during its passage through the housing 30, the dry gas flows over the pulsed laser 34, then over the laser amplifier 58, and finally over the holographic optics 36 in the main inferior space of the housing, thereby maintaining a relatively constant temperature above the dew point of the atmosphere. Moreover, the gas purges moisture, dust and the like from the housing and maintains a slight positive pressure in the housing to prevent entrance of dust and moist air into the housing.

The optical signature instrument also includes an impulser 22 for precussively loading the structure to be inspected to produce stress waves in the structure. The particular impulser shown constitutes the subject matter of Copending Application Ser. No. 598,900 (TRW Docket No. 74-233).

Impulser 22 comprises a generally triangular base plate 190 mounting suction cups 200 at the normally underside of the plate. Extending from each cup is a tube 202 through which the cup may be evacuated. Fixed to and rising from the top side of the plate at its center is a cylinder 204 containing a solenoid coil 206.

At the upper end of the coil is a sleeve 210 within the cylinder. The top of the cylinder is closed by a cap 212.

Figure 10:
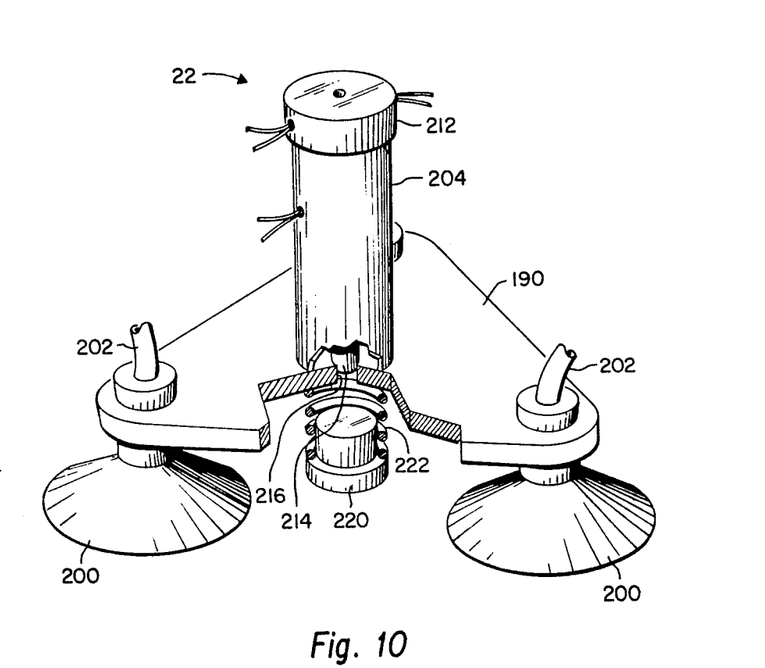
FIG. 10 is a perspective view of an impulser used in the instrument.
Figure 11:
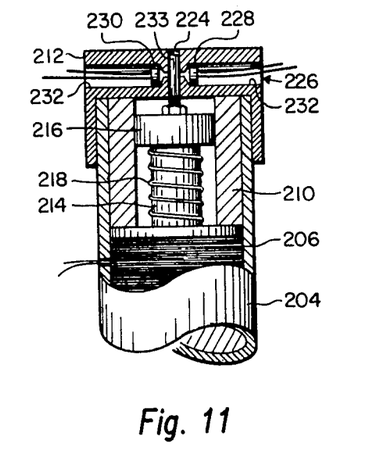
FIG. 11 is a fragmentary section through the impulser.

Slidable in the solenoid coil 206 is a solenoid plunger 214, the lower end of which extends slidably through a bore 216 in the base plate 216. On the upper end of the plunger is a shoulder 216 which slides in the sleeve 210. A spring 218 acting agaist this shoulder urges the plunger upwardly to its normal retracted position of FIGS. 10 and 11. Energizing of the coil 206 extends the plunger downwardly into impact with an anvil 220 below and attached to the base plate by a spring 222. The cylinder cap 212 has an opening 224. The impulser 22 has means 226 for generating a signal in response to extension of the plunger. The signal generating means shown comprises a light-emitting diode 228 and a photodiode detector 230 mounted in coaxial diametrically opposed bores 232 intersecting the cap opening 224. When the plunger 214 is retracted, an adjustable timing shaft 233 threaded in the plunger covers the bores to block light transmission from the diode to the detector. Extension of the plunger uncovers the bores to permit light transmission to the detector which then generates an output signal. The timing shaft is adjustable to adjust the timing of the signal relative to impact of plunger 214 with anvil 220.

This output signal from the impulser 22 fires the pulsed laser 34. Actuation of the impulser, in turn, is effected by the shutter 46 of the holographic recording unit 20. To this end, the shutter is equipped with a solenoid actuated latch 234 (FIG. 7) for releasably latching the shutter plunger 134 in its cocked position, i.e., the depressed plunger position in which the shutter is cocked, and with a switch 236 which is actuated by the plunger, during its upward extension stroke to open and then reclose the shutter, upon arrival of the plunger at the position where the shutter blades 132 are full open.

Figure 12:
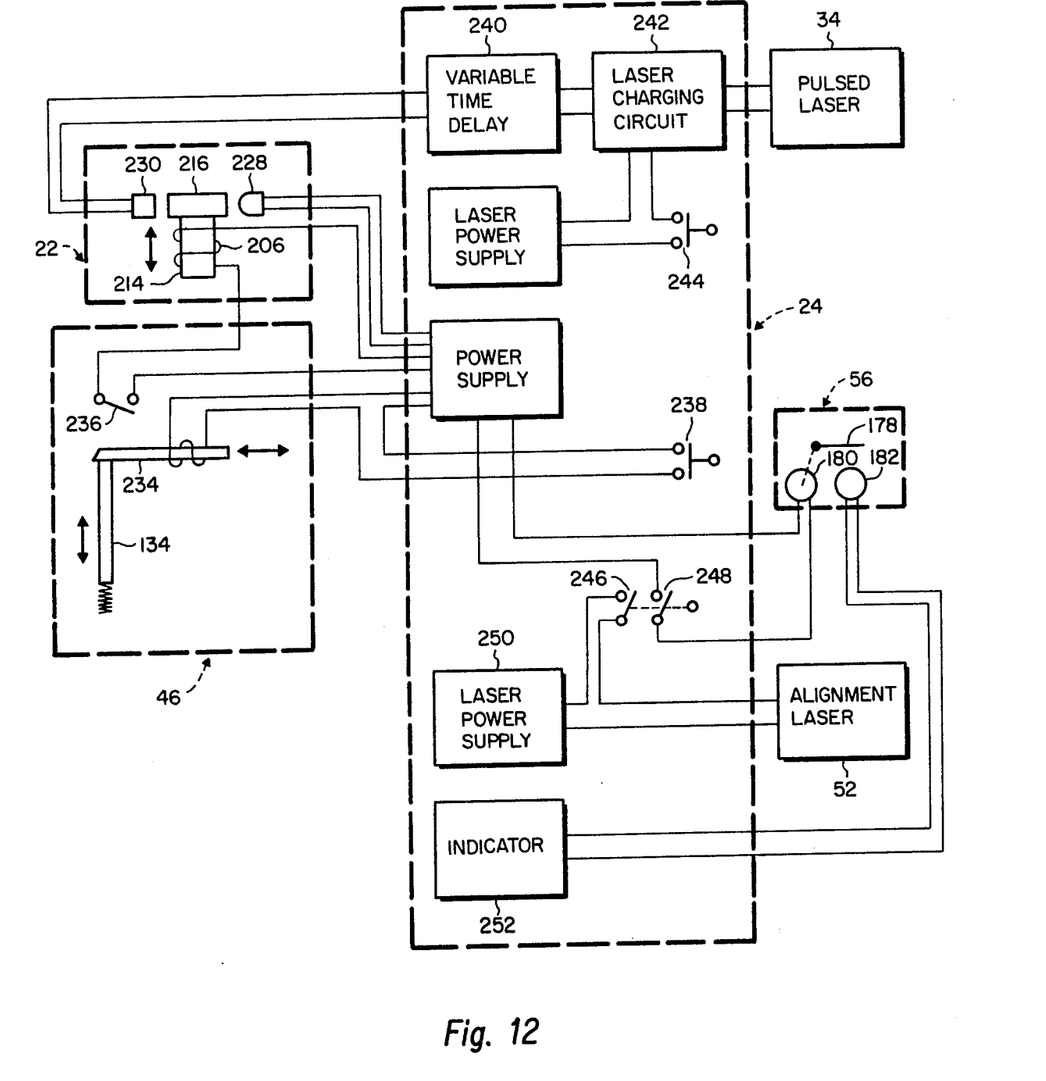
FIG. 12 is an electrical diagram of the instrument.

Turning to FIG. 12, it will be seen that the shutter latch solenoid 234 is controlled by a switch 238 on the control console 24. The shutter switch 236 is connected to the impulser solenoid coil 206 to energize the latter and thereby extend the impulser plunger 214 when the switch is closed by the shutter plunger 134 in the full open position of the shutter blades 132. The photo diode 230 of the impulser is connected through a variable time delay 240 to a pulsed laser charging circuit 242 in the control console. The charging circuit is charged to condition it to fire the pulsed laser 34 by a switch 244 on the control console and is triggered to actually fire the laser by the output signal generated by the photo diode 230 of the impulser in response to extension of the impulser plunger 214. The alignment laser 52 and the shutter solenoid 180 of the pulsed laser shutter-sensor unit 56 are controlled from the control console by switches 246, 248 which operate together to simultaneously activate the alignment laser power source 250 for operating the laser and the solenoid 180 for retracting the shutter 178 to its solid line position of FIG. 9. The output of the photo diode 182 of the unit is fed to the control console for monitoring the timing and amplitude of the pulsed laser output.

The operation of the optical signature instrument 10 will now be explained in the illustrated context of inspecting the aircraft 12 to determine its structural integrity by the structural integrity verification technique described in copending Application Ser. No. 456,998. Assuming that the alignment laser beam 53 has been properly aligned with the pulsed laser beam path in the manner explained earlier, the instrument truck 26 is situated, and its hoist 28 is vertically positioned, to locate the instrument in the best position for inspection of the particular aircraft structure of interest. Assume, for example, that the upper surface of the aircraft wing root section 254 (FIG. 1) is to be inspected. In this application, the instrument may be located in front of the wing root section with the holographic recording unit 20 elecated to a position somewhat above the level of the wing root section, as shown in FIG. 1.

The recording unit 20 is now aimed or pointed at the upper wing root surface region of interest by activating the alignment laser 52 to project the alignment laser beam 53 along the path $P_1$ of the pulsed laser scene beam 38 and rotating the optics assembly 42 of the recording unit about its pivot axis to aim the alignment beam at the surface region of interest. It will be understood, of course, that the alignment beam may be so aimed by observing the spot of light produced on the wing surface by the beam and adjusting the optics assembly to locate this spot at the approximate center of the surface region of interest. The alignment laser is then turned off. The path lengths of the pulsed laser scene and reference beams 38, 40 are now matched to the accuracy necessary for instrument operation by measuring the distance from the film 48 to the surface region of interest and adjusting the reference beam path length by adjusting the reflector assembly 100 and/or reflector 92 of the holographic optics 36 to the positions which provide matched path lengths. It will be understood that the reflector 92 provides a coarse or gross path length adjustment and the reflector assembly 100 a fine path length adjustment.

The impulser 22 is placed at some point along the aircraft wing 14 adjacent the wing root surface region of interest, as shown in FIG. 1, and the suction cups 200 of the impulser are evacuated through the tubes 202 by a vacuum source (not shown) to clamp the impulser firmly to the wing. This clamping operation causes the impulser anvil 220 to be clamped firmly between the wing and impulser plate 216.

The shutter 46 of the optics assembly 42 is now cocked by depressing the shutter plunger 134 to its cocked position, against the force of the plunger spring (not shown) the shutter being latched in this position by the solenoid latch 234. Thereafter, the charging circuit 242 for the pulsed laser 34 is energized by the switch 244 and, when fully charged, the holographic recording cycle is triggered by operating the switch 238 to actuate the shutter latch 234 and thereby release the shutter plunger 134 for upward extension by its spring to open and then reclose the shutter blades 132. Upon its arrival at the position where the shutter blades are approximately wide open, the shutter plunger actuates the shutter switch 236 to energize the solenoid 206 of the impulser 22. The impulser plunger 214 is then driven downwardly into impact with its anvil 220 to impulsively or dynamically load the aircraft wing and thereby generate stress waves in the wing which propagate through the wing root section 254.

During its downward travel, the impulser timing shaft 233 uncovers the bores 232 in the impulser cap 212, thereby producing an electrical output signal in timed relation to the plunger impact which triggers the pulsed laser charging circuit 242 through the variable time delay 240 to initiate a pulsed lasing cycle of the laser 34. This laser is conventional, as mentioned earlier, and is presetable by conventional means (not shown) to emit one or more short laser beam pulses in rapid succession during each lasing cycle. In the particular aircraft inspection application under discussion, the laser 34 is preset to emit two pulses during each cycle.

From the description to this point, it will be understood that actuation of the shutter latch 234 initiates or triggers an operating cycle of the optical signature instrument 10. During this cycle, the shutter 46 opens and closes, the impulser 22 propagates stress waves through the aircraft wing root section 254, and the laser 34 emits two short laserl beam output pulses in rapid succession, all in timed relation. Each laser output pulse is split into a scene beam pulse directed along the external beam path $P_1$ of the holographic recording unit 20 to illuminate the wing root section surface region of interest toward which the recording unit is aimed, in the manner described earlier, and a reference beam pulse directed along the path $P_2$ toward the shutter aperture 44.

The variable time delay 240 is adjustable to vary the timing of the laser output pulses relative to actuation of the impulser 22 and hence relative to propagation of the impulser generated stress waves through the aircraft wing root section 254. In the aircraft inspection application under discussion, this timing is so adjusted that both output pulses occur while the shutter 46 is substantially wide open and at least the second pulse occurs during propagation of the stress waves through the wing root section surface region of interest. In this regard, it will be understood that the opening and closing movement of the shutter blades 132 occurs relatively slowly compared to the remaining events of the instrument cycle, i.e., impulser actuation and laser output pulses, so that the pulses may be timed to occur while the shutter is wide open.

As further explained in the latter application, since the shutter 46 is open during the occurrence of each laser beam output pulse from the laser 34, each pulse is effective to record on the holographic film 48 a hologram of the wing root section surface region of interest. The resulting hologram, then, is a double exposure hologram. Moreover, since the two holograms are recorded at different instants relative to the propagation of the stress waves through the surface region of interest, the two recordings occur under differing stress conditions in the surface region and thus produce on the film a holographic interferrogram containing a deformation fringe pattern representing the deformations resulting from the change in stress conditions between the two recordings, all as explained in the earlier mentioned Copending Application Ser. No. 456,998. The foregoing inspection procedure may be repeated periodically to yield a library of interferrograms whose deformation fringe patterns may be compared to evaluate or verify the structural integrity of the aircraft.

As mentioned earlier, a light filter 138 extends across the aperture 44 of shutter 46. This filter transmits the pulsed laser beam light but blacks ambient light. Thus, the shutter and filter permit the inspection procedure described above to be performed under ambient light conditions. If the inspection is carried out in the dark, the shutter and filter may be eliminated. In this case, the shutter switch 236 may be replaced by a manual switch for triggering the operating cycle of the optical signature instrument. During the instrument operation, the gas purge and temperature control means 60 maintain a constant temperature, moisture and dust free atmosphere in the housing 30 of the recording unit 20.

It will be evident at this point that the capability of adjusting the optics assembly 42 of the holographic recording unit 20 to aim or point the unit at a selected aircraft structure of interest without adjusting the housing 30 of the unit uniquely adapts the present optical signature instrument 10 to inspection of virtually any part of the aircraft 12. FIG. 2, for example, shows the instrument in position for inspecting the nosewheel gear or adjacent underseal of the fusilage. FIG. 3 shows the instrument in position for inspecting a jet engine nacelle. In each case, of course, the impulser 22 will be mounted in an appropriate position on the structure to be inspected.

While the instrument 10 has been described in connection with its use for inspecting aircraft, the instrument obviously may be used to inspect virtually any type of load bearing structure. Moreover, the instrument may be used without the impulser 22 and with the laser set to single pulse for recording simple holograms of any subject.

In order to permit alignment of the pulsed laser 34, the back wall of the recording unit housing 30 is provided with an opening 256 between the laser and the rear reflector 82. This opening is closed by a door 258 which is hinged along its upper edge to open inwardly for insertion through the opening of a rectangular block-like head 260 on an otherwise conventional autocollimator 262. In the underside of the head is a dovetailed groove 264 for slidably receiving a mating guide 266 on the recording unit base plate 62 to position the autocollimator in the housing. At the inner end of the guide is a stop 268 against which the head abuts when fully inserted into the housing. Extending from the end face of the head 260 are electrical connector prongs 270 which are electrically connected to the collimating lamp (not shown) in the autocollimator and which are engagable in electrical sockets (not shown) in the stop 268 to energize the lamp from the recording unit.

The collimating beam from the lamp travels axially through the collimator to a reflector 272 in the autocollimator head 260 and is then reflected at right angles through an apperture 274 in the side of the head along a path which is aligned with the axis of the laser 34 when the autocollimator 262 is positioned in the recording unit 20. Accordingly, the beam is transmitted through the laser rod and is then reflected back through the aperture 274 and then at right angles to the autocollimator eye piece 276 to permit alignment of the laser in the usual way. If desired switch means, such as a Mercury switch, may be mounted on the door 258 to inactivate the lasers 52, 34 for safety purposes when the door is opened by insertion of the autocollimator.

As noted earlier, the holographic recording unit 20 possesses the advantage that it may be pointed or aimed through a range of directions, by adjusting the optics assembly 42, without repositioning the entire unit. This is an advantage, not only because of the problems posed by adjustably supporting the entire unit, which may be relatively large in size and massive, but further because the pockel cell which is commonly used in a pulsed laser is liquid filled and hence would severely restrict the adjustment range of the entire unit. However, it is considered to be within the scope of the invention to mount the optics assembly elements in a fixed position on the recording unit. With regard to this pointing or aiming adjustment of the recording unit, it is evident that the scene and reference beam paths $P_1$, $P_2$ and the film holder and shutter might be independently adjustable. It is further evident that in come cases only the scene beam path or only the shutter-film holder and reference beam path may be made adjustable, so long as the range of adjustment is sufficiently small to maintain the required holographic recording relation of the recording film 48 to the beam paths, i.e., the relation in which the film continues to be illuminated both by the reference beam and the relected scene beam light from the subject.

What is claimed is:
1. A holographic recording unit comprising;
   a mounting base,
   holographic recording means on said base including means for producing coherent holographic scene and reference beams, directing said scene beam outwardly from said recording unit along an external scene beam path to illuminate a subject situated in said path, and directing said reference beam along a reference beam path, and means for positioning a holographic recording medium in holographic recording relation to said beam paths wherein the medium is disposed for illumination both by said reference beam and by reflected scene beam light from the subject, and means for adjusting said beam paths and positioning means in unison in such a way as to maintain a fixed relation between said beam paths and the recording medium.
2. A holographic recording unit according to claim 1 wherein:
   the unified adjustment of said beam paths and positioning means involves a pivotal motion of said paths and positioning means about a pivot axes transverse to said scene beam path.
3. A holographic recording unit according to claim 1 including:
   means on said base for directing an alignment beam along said external scene beam path.
4. A holographic recording unit according to claim 1 including:
   means on said base for matching the path lengths of said beams.
5. A holographic recording unit according to claim 1 wherein:
   said positioning means comprises a shutter having an aperture, and means for supporting said medium behind said shutter for illumination of the medium by said reference beam and reflected scene beam light through the shutter aperture when the shutter is open.
6. A holographic recording unit according to claim 5 including:
   a light filter extending across said aperture which passes the light of said beams and blocks ambient light.
7. A holographic recording unit according to claim 6 wherein:
   the unified adjustment of said beam paths and positioning means involves a pivotal motion of said paths and positioning means about a pivot axis transverse to said scene beam path.
8. A holographic recording unit according to claim 7 including:
   means on said base for matching the path lengths of said beams.
9. A holographic recording unit according to claim 8 including:
   means on said base for directing an alignment beam along said external scene beam path.
10. A holographic recording unit comprising:
    a mounting base for mounting a pulsed laser, an adjustable optics assembly on said base, holographic optics on said base for splitting the laser output beam into scene and reference beams and directing the latter beams to said optics assembly along scene and reference beam paths, respectively, said optics assembly including first optical means in said scene beam path for directing said scene beam outwardly from the recording unit along an external beam path having a fixed direction relative to the assembly for illuminating a subject situated along a given axis of the assembly, means for positioning a holograhpic recording medium along and in a transverse plane of said axis for illumination of the medium by reflected scene beam light from the subject, and second optical means in said reference beam path for directing said reference beam toward said plane along an external path having a fixed direction relative to the assembly to illuminate said recording medium, whereby said recording unit is adapted to record holograms of subjects located along said axis, and said optical means and positioning means being adjustable in unison to adjust the direction of said axis relative to said base by adjustment of said optics assembly.

11. A holographic recording unit according to claim 10 wherein:

said optics assembly is rotatably adjustable about a pivot axis transverse to said given axis of the assembly, and said scene and reference beams are directed to said assembly along said pivot axis and said optical means are located on said pivot axis.

12. A holographic recording unit according to claim 10 wherein:

said holographic optics includes means for matching the path lengths of said scene and reference beams.

13. A holographic recording unit according to claim 10 wherein:

said positioning means comprises a shutter having an aperture on said given axis, means for supporting said medium behind said shutter for illumination of the medium by said reference bean and reflected scene beam light through the shutter aperture when the shutter is open.

14. A holographic recording unit according to claim 13 including:

a light filter extending across said aperture which passes the light of said beams and blocks ambient light.

15. A holographic recording unit according to claim 10 including:

means for mounting an alignment laser on said base, and means for directing the alignment laser beam along a path coinciding with said scene beam paths.

16. A holographic recording unit according to claim 15 including:

a pulsed laser and an alignment laser mounted on said base, said alignment beam path passing through said pulsed laser along the pulsed laser output beam path, and a shutter between said lasers movable into and from said alignment beam path.

17. A holographic recording unit according to claim 10 wherein:

said optics assembly is rotatably adjustable about a pivot axis transverse to said given axis of the assembly, said scene and reference beams are directed to said assembly along said pivot axis, and said optical means are located on said pivot axis, said positioning means comprises a shutter having an aperture on said given axis, and means for supporting said medium behind said shutter for illumination of the medium by said reference beam and reflected scene beam light through the shutter aperture when the shutter is open, a light filter extends across said aperture which passes the light of said beams and blocks ambient light, and said holographic optics includes means for matching the path lengths of said scene and reference beams.

18. A holographic recording unit according to claim 17 including:

a pulsed laser and an alignment laser mounted on said base, means for directing the alignment laser beam along a path passing through said pulsed laser approximately coincident with the path of the pulsed laser output beam, whereby the alignement beam is directed outwardly from the recording unit along said external scene beam path.

19. A holographic recording unit comprising:

a housing, a pulsed laser in said housing, holographic optics in said housing for splitting the laser output beam into scene and reference beams and directing the latter beams along internal scene and reference beam paths, respectively, within the housing, first optical means on said housing in said scene beam path for directing the scene beam outwardly from the housing along an external beam path to illuminate a subject located on a given axis extending outwardly from the housing, means on said housing for positioning a holographic recording medium on and in a plane transverse to said axis for illumination by reflected scene beam light from the subject, second optical means on said housing in said reference beam path for directing said reference beam toward said plane along an external beam path to illuminate said recording medium, whereby said recording unit is adapted to record holograms of subjects located on said axis, and means for adjusting said optical means and said positioning means relative to said housing to adjust the direction of said external beam paths relative to said housing while maintaining a fixed relation between said external beam paths and said recording medium.

20. A holographic recording unit according to claim 19 including:

an alignment laser in said housing, and means in said housing for directing the alignment laser beam along said scene beam paths.

21. A holographic recording unit according to claim 19 wherein:

said laser is located adjacent one wall of the housing with the laser axis parallel to said wall, said holographic optics includes a reflector along said axis, said wall having a door closing an opening in said wall between said laser and reflector, an autocollimator insertable into said housing through said opening for aligning said laser, means for locating said autocollimator in a fixed position in said housing, means for inactivating said laser against lasing when said autocollimator is in said fixed position, and said autocollimator including means for directing a light beam through said laser along said laser axis when the autocollimator is in said fixed position.

22. A holographic recording unit according to claim 21 including:

coacting electrical couupling means in said housing and autocollimator which mate in said fixed position to supply electrical power to the autocollimator from the recording unit.

23. A holographic recording unit according to claim 19 wherein:

said optical means and positioning means are adjustable in rotation about a pivot axis transverse to said given axis, said optical means are situated on said pivot axes, and said reference and scene beams are directed to said optical means along said pivot axes.

24. A holographic recording unit according to claim 23 wherein:

said optical means and positioning means constitute a pivotably adjustable optics assembly mounting said optical means and positioning means in fixed relation to one another for rotation in unison about said pivot axis.

25. A holgraphic recording unit according to claim 24 including:

an alignment laser in said housing, and means in said housing for directing the alignment laser beam along said scene beam paths.

26. A holographic recording unit according to claim 24 including:

means in said housing for adjusting one of said internal beam paths to match the path lengths of said scene and reference beams.

27. A holographic recording unit according to claim 24 including:

means for circulating a dry temperature controlled gas through said housing.

28. A holographic recording unit according to claim 24 wherein:

said housing is a relatively flat rectangular housing having a recess along one edge bounded at opposite sides by side walls of said housing, said optics assembly is positioned in said housing recess with its pivot axis extending lengthwise of said housing edge between said side walls, said scene and reference beams are directed to said optics assembly through holes in said sidewalls on said pivot axis, said positioning means comprises a shutter having an aperture on said given axis and means for supporting said medium behind said shutter for illumination of the medium by said reference beam and reflected scene beam light through the shutter aperture when the shutter is open, an alignment laser in said housing, and means in said housing for directing the alignment laser beam along said scene beam paths, means in said housing for adjusting one of said internal beam paths to match the path lengths of said scene and reference beams, means for circulating a dry temperature controlled gas through said housing.

29. A holographic recording unit according to claim 24 wherein:

said positioning means comprises a shutter having an aperture on said given axis, and means for supporting said medium behind said shutter for illumination of the medium by said reference beam and reflected scene beam light through the shutter aperture when the shutter is open.

30. A holographic recording unit according to claim 29 including:

a light filter extending across said aperture which passes the light of said beams and blocks ambient light.

* * * * *